United States Patent
Pejhan et al.

(10) Patent No.: US 6,850,564 B1
(45) Date of Patent: Feb. 1, 2005

(54) APPARATUS AND METHOD FOR DYNAMICALLY CONTROLLING THE FRAME RATE OF VIDEO STREAMS

(75) Inventors: Sassan Pejhan, Plainsboro, NJ (US); Ya-Qin Zhang, Cranbury, NJ (US); Tihao Chiang, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 682 days.

(21) Appl. No.: 09/144,240

(22) Filed: Aug. 31, 1998

Related U.S. Application Data

(60) Provisional application No. 60/090,814, filed on Jun. 26, 1998.

(51) Int. Cl.[7] .............................. H04B 1/66; H04N 7/12
(52) U.S. Cl. .............................. 375/240.02; 348/404.1; 375/240.26
(58) Field of Search ................................. 348/6, 7, 8, 9, 348/10, 13, 19, 845, 390.1, 404, 387.1, 556, 443; 370/231, 232, 468; 375/240.01, 240.26, 240.02; 455/5.1; 710/11; 386/109; 725/47, 46, 61, 90, 92, 95

(56) References Cited

U.S. PATENT DOCUMENTS

| | | | | |
|---|---|---|---|---|
| 5,604,731 A | * | 2/1997 | Grossglauser et al. | 370/232 |
| 5,659,539 A | * | 8/1997 | Porter et al. | 348/13 |
| 5,724,475 A | * | 3/1998 | Kirsten | 386/109 |
| 5,790,935 A | * | 8/1998 | Payton | 455/5.1 |
| 5,805,203 A | * | 9/1998 | Horton | 348/13 |
| 5,805,925 A | * | 9/1998 | Blackwell et al. | 710/11 |
| 5,819,048 A | * | 10/1998 | Okazaki et al. | 348/19 |
| 5,864,682 A | * | 1/1999 | Porter et al. | 370/468 |
| 5,974,235 A | * | 10/1999 | Nunally et al. | 375/240.01 |
| 6,014,693 A | * | 1/2000 | Ito et al. | 348/13 |

FOREIGN PATENT DOCUMENTS

| | | |
|---|---|---|
| EP | 0 776 130 A | 5/1997 |
| WO | WO 97 22201 A | 6/1997 |

OTHER PUBLICATIONS

Mitchell Pennebakker Fogg Legall: "MPEG video compression standard" 1996, Chapman & Hall, New York XP002118039 p. 135 –p. 165.

PCT Search Report corresponding to PCT application PCT/US99/14510.

* cited by examiner

*Primary Examiner*—Gims Philippe
(74) *Attorney, Agent, or Firm*—William J. Burke

(57) ABSTRACT

An apparatus and method for dynamically varying the frame rate of an image sequence is disclosed. In one embodiment, the image sequence is encoded and stored at different frame rates (e.g., 30, 25, 20 fps and so on). Alternatively, only the motion information, e.g., motion vectors, for the other frame rates are stored.

12 Claims, 4 Drawing Sheets

APPARATUS AND METHOD FOR DYNAMICALLY CONTROLLING THE FRAME RATE OF VIDEO STREAMS

This application claims the benefit of U.S. Provisional Application No. 60/090,814 filed on Jun. 26, 1998, which is herein incorporated by reference.

The invention relates generally to the field of digital multimedia communications over a network, e.g., computer networks. More specifically, the invention relates to a method of storing motion information for a sequence of images in different frame rates to effect dynamic frame rate control over a network.

BACKGROUND OF THE DISCLOSURE

The increasing demand for digital video/audio information presents an ever increasing problem of transmitting and/or storing an enormous amount of information. For example, the growth of the Internet and the proliferation of Internet browsers in recent years has enabled millions of users to access various information in a matter of seconds. Most of the information is currently in the form of text and/or still images and graphics. Generally, this type of information can be quickly downloaded and displayed by a user. More recently, audio and video clips or sequences have been added to numerous webs sites. Without an increase in bandwidth, accessing these clips requires more computational cycles and access time due to the sheer size of the image sequences.

Two methods of accessing an image sequence across a network are available. First, the user can download the compressed bitstream in its entirety, and then decode and display the image sequence locally using the user's computer. One drawback of this method is the length of time that a user must wait while the image sequence is being downloaded. Another drawback is that the user may need to reserve a large storage space to accommodate a large image sequence.

A second, and more practical, method is referred to as "video streaming" where the processes of downloading, decoding and displaying the image sequence can be performed simultaneously. Namely, each frame of a sequence is immediately decoded and displayed upon receipt by the user.

However, video streaming poses a new set of challenges. Generally, the pre-recorded original video sequence is compressed at a certain bit-rate. This bit rate may not coincide with the channel bit rate used by the user. Namely, users may download the image sequence at a different bit rate, depending on the available bandwidth, e.g., high user access time versus low user access time. Although the server can reduce the delivery rate of the image sequence to match the channel bit rate, such reduction will result in a "slow motion" display at the receiver.

Alternatively, one solution to address varying bit rate is to partially decode the image sequence at the server, and then re-encode the image sequence using different coding parameters, e.g., different quantizer scales, thereby resulting in a different bit-rate that coincides with the channel bit rate used by the user. This method has proven to be quite powerful, and accurate, for a reasonable range of bit-rates. Namely, this method effectively provides a "knob" with which the user can vary the bit-rate of the image sequence. Unfortunately, as the bit rate decreases significantly, the effect of using this "knob" is a significant degradation in the spatial quality of the image sequence. Furthermore, this "knob" would not be practical if the user wishes to maintain the spatial resolution at the expense of sacrificing the temporal resolution, e.g., reducing the frame rate from 30 frames/second to 15 frames/second.

Therefore, a need exists in the art for an apparatus and method for effecting dynamic frame rate control over a network.

SUMMARY OF THE INVENTION

The present invention provides a method for dynamically varying the frame rate of an image sequence. More specifically, in one embodiment, the image sequence is encoded and stored at different frame rates (e.g., 30, 15, 10 and 5 fps). This embodiment increases the storage requirement for a server.

In a second embodiment, only the motion information, e.g., motion vectors, for the other frame rates are stored. Namely, the image sequence is first encoded and stored at a preferred frame rate and then the same image sequence is encoded at one or more different frame rates. The encoding process at other frame rates can be performed off-line. However, only the motion information is saved and stored, e.g., in "motion files", for the other frame rates, thereby reducing the storage requirement of the server. Thus, when it is necessary to re-encode the image sequence to accommodate a different frame rate, motion vectors are obtained from a storage device, instead of being computed. This method enables the image sequence to be re-encoded at a different frame-rate in real-time. Additionally, the motion files are significantly smaller than the corresponding compressed image sequence.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
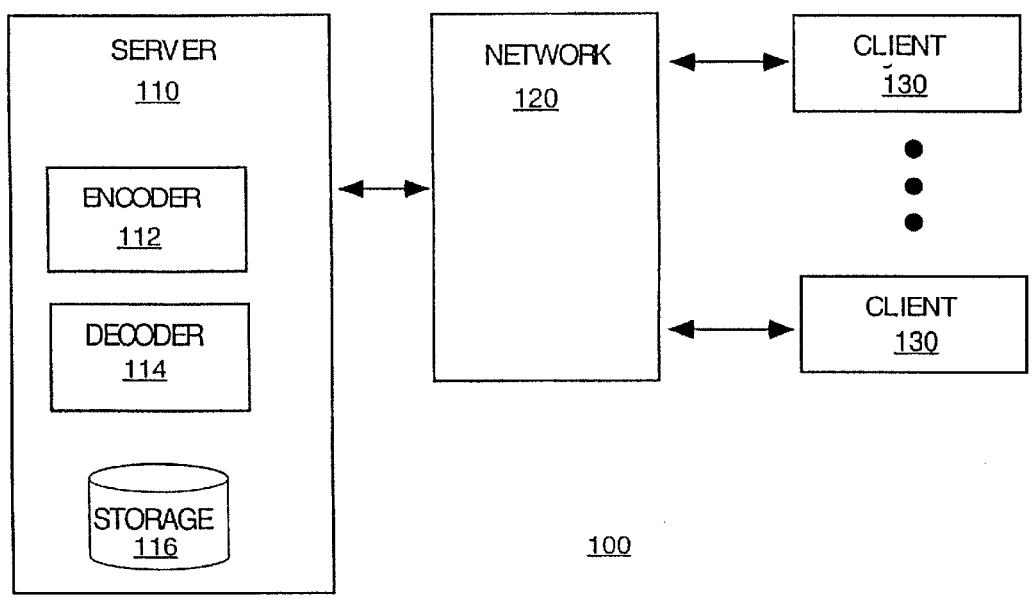
FIG. 1 illustrates a block diagram of a network environment having a server incorporating the dynamic frame rate control of the present invention.

FIG. 1 illustrates a block diagram of a network environment having a server 110 incorporating the dynamic frame rate control of the present invention. More specifically, a plurality of clients or users 130 are able to access various image sequences stored on the server 130 via a communication or computer network 120.

As discussed above, if the bit rate of the pre-recorded image sequence does not match the bit rate of the communication channel used by the client, then the server can adjust the bit rate of the pre-recorded image sequence by decoding and re-encoding the image sequence in the bit rate of the communication channel used by the client. Unfortunately, since such real-time decoding/re-encoding operation is computationally expensive, the server will likely be equipped with expensive special purpose hardware.

More specifically, the computational cost is attributed to the extremely time-consuming process of estimating motion as employed in encoding standards such as MPEG and H.263 which employ motion estimation techniques. Some implementations may employ full motion search algorithms which generate very accurate motion information, but at the expense of incurring a very high cost in computational cycles. As such, these implementations are not practical when it is performed in real-time using software, thereby requiring the use of faster special purpose hardware. In addition, with these encoding standards, the server cannot arbitrarily drop frames in the compressed domain due to inter frame encoding. Thus, if the server is to re-encode the image sequence (video stream) at a different frame rate, the server will have to recompute the motion information, e.g., motion vectors at the new frame rate.

The present invention discloses a dynamic frame rate control method without the use of special purpose hardware. Namely, FIG. 1 illustrates a server 110 having an encoder 112, a decoder 114 and a storage 116. The encoder 112 is an encoder capable of performing motion estimation and retrieving motion information. As such, the encoder 112 can be implemented as an MPEG or H.263 compliant encoder.

In operation, one or more image sequences are pre-encoded and stored in storage 116 at a particular bit rate and frame rate. If a client 130 requests an image sequence from the server 110 that matches the bit rate and frame rate of the pre-recorded image sequence, then the server will simply forward the image sequence directly to the client via the network without further processing.

If the client requests an image sequence at a different frame rate from the frame rate in which the image sequence was encoded, then the server 110 must decode the encoded image sequence using the decoder 114. It should be noted that if the original image sequence is also stored in the server 110, then the decoding operation and the decoder 114 itself can be omitted all together, since the original image sequence is readily available.

Once the original image sequence is obtained (either through decoding the encoded image sequence or retrieving the original image sequence from storage), the encoder 112 can now re-encode the image sequence at the new frame rate. However, the encoder 112 does not have to compute the motion information from the image sequence. Instead, the encoder 112 reads the motion information from a "motion file" associated with the new frame rate, e.g., 25 fps, 20 fps, 15 fps, 10 fps, 5 fps and so on. Since the majority of the computational cycles in an encoding process is spent in generating motion information, e.g., motion vectors, encoder 112 can now quickly re-encode the image sequence in real-time using the stored motion information to accommodate a frame rate as requested by a client.

Effectively, a second knob is provided to a client for varying the frame rate of the image sequence. By reducing the frame-rate of the image sequence, the bandwidth will be reduced without further loss in the spatial quality (temporal quality would be reduced instead). The present dynamic frame rate control is further described in detail below with reference to FIGS. 3 and 4.

Figure 2:
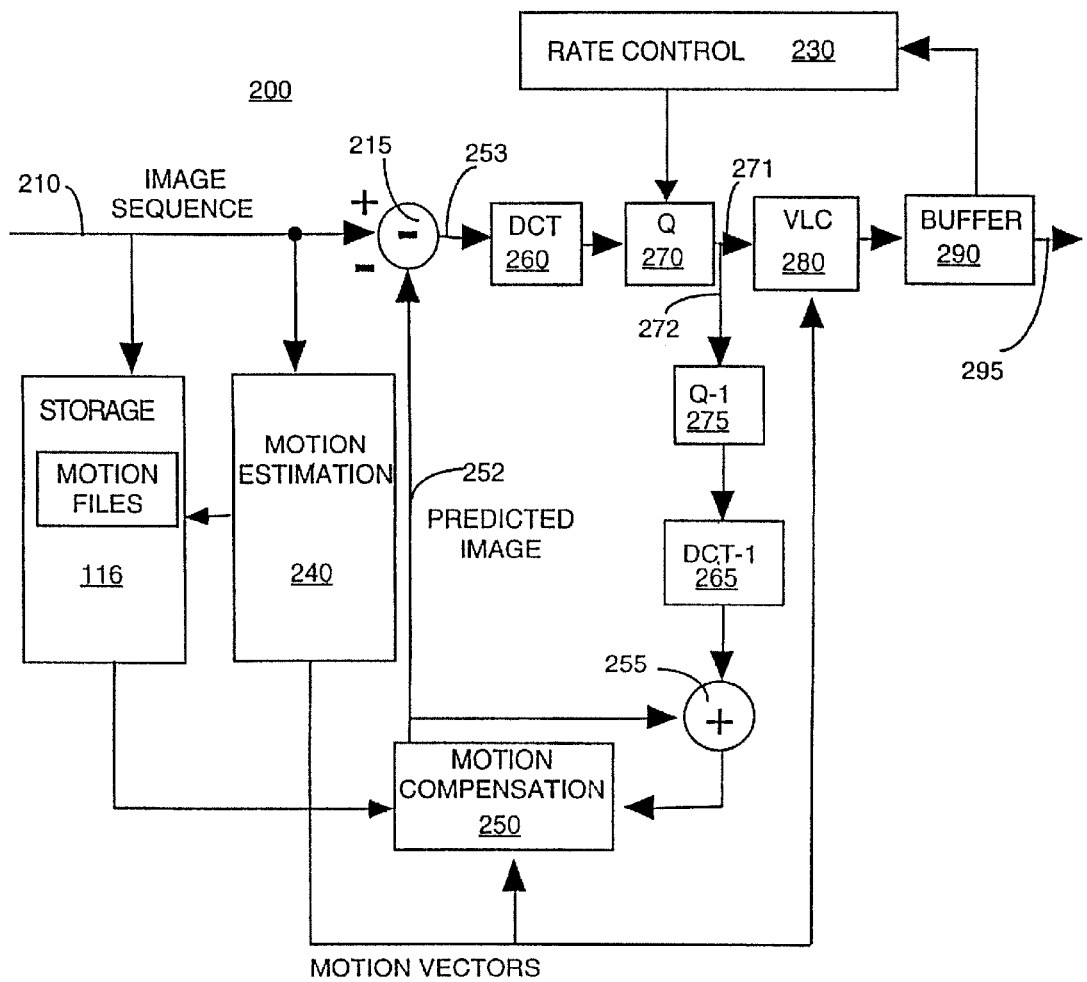
FIG. 2 illustrates a block diagram of an encoder incorporating the dynamic frame rate control of the present invention.

FIG. 2 illustrates a block diagram of an exemplary encoder 200 incorporating the dynamic frame rate control method of the present invention. Although the present invention is described below with reference to an MPEG compliant encoder, those skilled in the art will realize that the present invention can be adapted to other encoders that employ motion estimation technique, e.g., an H.263 compliant encoder.

The encoder 200 comprises a motion estimation module 240, a motion compensation module 250, a rate control module 230, a DCT module 260, a quantization (Q) module 270, a variable length coding (VLC) module 280, a buffer 290, an inverse quantization ($Q^{-1}$) module 275, an inverse DCT ($DCT^{-1}$) transform module 265, a subtractor 215 a summer 255, and a storage 116 for storing motion files. Although the encoder comprises a plurality of modules, those skilled in the art will realize that the functions performed by the various modules are not required to be isolated into separate modules as shown in FIG. 2. For example, the set of modules comprising the motion compensation module 250, inverse quantization module 275 and inverse DCT module 265 is generally known as an "embedded decoder".

FIG. 2 illustrates an input video image (image sequence) on signal path 210 which is digitized and represented as a luminance and two color difference signals ($Y$, $C_r$, $C_b$) in accordance with the MPEG standards. The digitized signal may optionally undergo preprocessing such as format conversion for selecting an appropriate window, resolution and input format.

The input video image on path 210 is received into motion estimation module 240 for estimating motion vectors. A motion vector is a two-dimensional vector which is used by motion compensation to provide an offset from the coordinate position of a block in the current picture to the coordinates in a reference frame. The reference frames can be a previous frame (P-frame), or previous and/or future frames (B-frames). The use of motion vectors greatly enhances image compression by reducing the amount of information that is transmitted on a channel because only the changes between the current and reference frames are coded and transmitted.

Alternatively, the present invention incorporates a storage 116 for storing motion files for an image sequence at various frame rates. Namely, if the current image sequence on path 210 has been previously encoded and the motion information for the image sequence is stored in storage 116, then the motion estimation process performed by the motion estimation module 240 is bypassed and the associated motion vectors for a particular frame rate are simply read from a motion file stored in storage 116. This process greatly increases the speed with which the image sequence is encoded. However, if the image sequence was not previously encoded or the motion information for a desired frame rate was not previously generated, then the motion vectors are generated using motion estimation module 240. The resulting motion vectors can then be stored in a new motion file in storage 116.

The motion vectors from the motion estimation module 240 or the storage 116 are received by the motion compensation module 250 for improving the efficiency of the prediction of sample values. Motion compensation involves a prediction that uses motion vectors to provide offsets into the past and/or future reference frames containing previously decoded sample values that are used to form the prediction error.

Furthermore, prior to performing motion compensation prediction for a given macroblock, a coding mode must be selected. In the area of coding mode decision, MPEG provides a plurality of different macroblock coding modes. Specifically, MPEG-2 provides macroblock coding modes which include intra mode, no motion compensation mode (No MC), frame/field/dual-prime motion compensation inter mode, forward/backward/average inter mode and field/frame DCT mode.

Once a coding mode is selected, motion compensation module 250 generates a motion compensated prediction (predicted image) on path 252 of the contents of the block based on past and/or future reference pictures. This motion compensated prediction on path 252 is subtracted via subtractor 215 from the video image on path 210 in the current macroblock to form an error signal or predictive residual signal on path 253. It should be noted that if a current frame is encoded as an I-frame, then the signal on path 253 is simply the original picture and not a predictive residual signal.

The DCT module 260 then applies a forward discrete cosine transform process to each block of the predictive residual signal to produce a set of eight (8) by eight (8) block of DCT coefficients. The DCT basis function or sub-band decomposition permits effective use of psychovisual criteria which is important for the next step of quantization. It should be noted that other transforms can be employed, e.g., wavelet transform.

The resulting 8×8 block of DCT coefficients is received by quantization module 270 and variable length coding (VLC) module 280 where the DCT coefficients are quantized and coded. Finally, the data stream is received into a "First In-First Out" (FIFO) buffer 290. In applications that involve a fixed-rate channel, a FIFO buffer is used to match the encoder output to the channel for smoothing the bit rate. Thus, the output signal of FIFO buffer 290 on path 295 is a compressed representation of the input video image on path 210.

The rate control module 230 serves to monitor and adjust the bit rate of the data stream entering the FIFO buffer 290 to prevent overflow and underflow on the decoder side (within a receiver or target storage device, not shown) after transmission of the data stream. Furthermore, the bit rate of the image sequence can be adjusted via rate control module 230, e.g., by changing the quantization scale.

The resulting 8×8 block of quantized DCT coefficients from the quantization module 270 is also received by the inverse quantization module 275 via signal connection 272. At this stage, the encoder regenerates I-frames and P-frames of the input video image by decoding the data so that they are used as reference frames for subsequent encoding.

The resulting dequantized 8×8 block of DCT coefficients are passed to the inverse DCT module 265 where inverse DCT is applied to each macroblock to produce the decoded error signal. This error signal is added back to the prediction signal from the motion compensation module via summer 255 to produce a decoded reference picture (reconstructed image).

Figure 3:
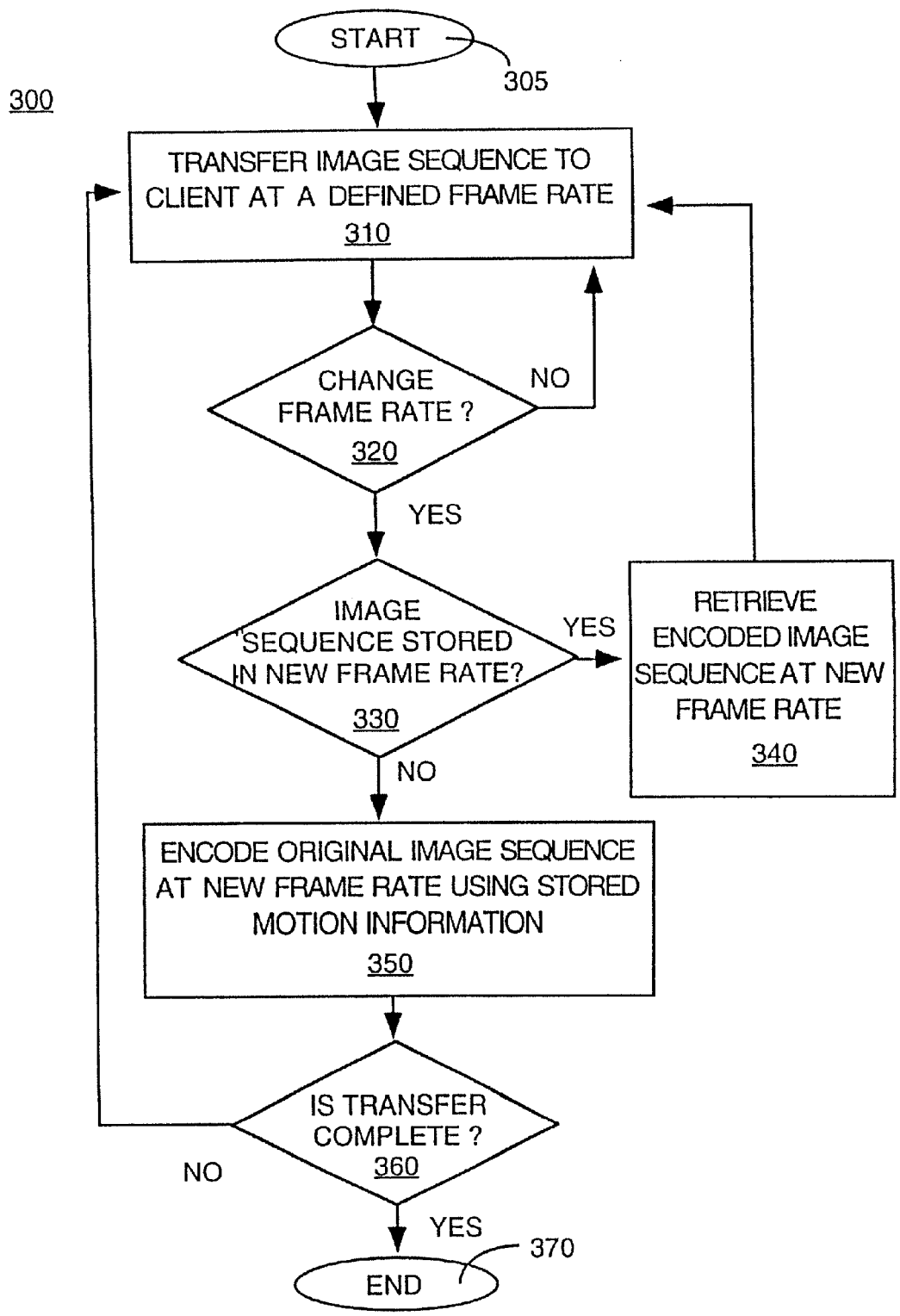
FIG. 3 illustrates a flowchart of a method for effecting the dynamic frame rate control.

FIG. 3 illustrates a flowchart of a method 300 for effecting the dynamic frame rate control of the present invention. More specifically, FIG. 3 illustrates a method for allowing a client to dynamically change the frame rate of an image sequence.

Method 300 starts in step 305 and proceeds to step 310, where an image sequence is transferred to a client at a predefined frame rate. It should be noted that if the frame rate requested by the client does not match the frame rate of the pre-recorded image sequence, then step 310 is bypassed and method 300 proceeds to step 320.

In step 320, method 300 queries whether the frame rate is changed. The frame rate of an image sequence can be changed for a number of different reasons, e.g., as requested by the client, or the bandwidth of the communication channel has changed and is detected by the server. If the query is negatively answered, then method 310 returns to step 310 and continues sending the image sequence to the client at a predefined frame rate. If the query is affirmatively answered, then method 300 proceeds to step 330.

In step 330, method 300 queries whether the image sequence is stored in the desired new frame rate. Namely, method 300 is inquiring whether there is a stored image sequence that was previously encoded at the desired frame rate.

In one embodiment of the present invention, each image sequence is encoded at a plurality of different frame rates (stored information). For example, an original image sequence can be encoded in three different frame rates, such as 30 fps, 25 fps and 20 fps. If the frame rate is changed from 30 fps to 25 fps, the server simply reads the image sequence from a different file. However, this embodiment dictates a large storage requirement for the server.

Returning to step 330, if the query is affirmatively answered, then method 300 proceeds to step 340, where the stored encoded image sequence at the new frame rate is retrieved from a storage, e.g., storage 116 of FIG. 1. Method 300 then returns to step 310 where the image sequence is sent to the client at the new predefined frame rate. If the query is negatively answered, then method 310 proceeds to step 350, where the original image sequence is encoded at the new frame rate using stored motion information, e.g., as stored in motion files.

Figure 4:
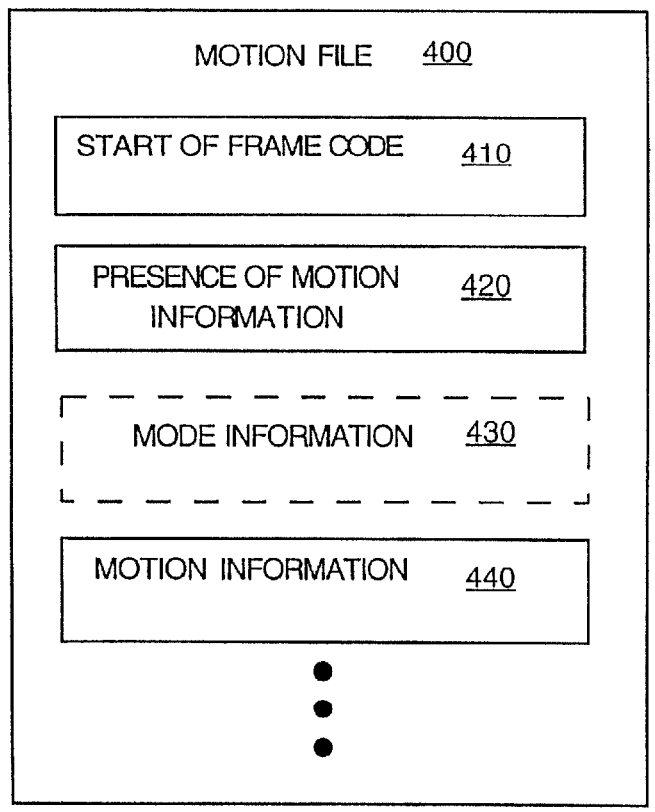
FIG. 4 illustrates a block diagram of a motion file of the present invention.

FIG. 4 illustrates a block diagram of an exemplary motion file 400 of the present invention. Motion file 400 comprises a start of frame code field 410, a presence of motion information field 420, an optional mode information field 430 and the actual motion information 440.

The start of frame code field 410 is a field that indicates the beginning of a frame, which is then followed by motion information for that frame, e.g., a first frame start code field 410, followed by motion information for the first frame, a second frame start code field 410, followed by motion information for the second frame, and so on. Namely, the start of frame code field 410 serves as a demarcation for separating motion information of successive frames.

To illustrates, if the present invention is implemented in conformance to the coding standard of H.263, the frame start code field is implemented as the 17 bit start of picture code for each frame that is present in all H.263 encoded frames. This allows the real-time encoding process to switch between frame rates in the middle of a transmission for example.

The presence of motion information field 420 provides information to the encoder concerning block-based information. The following disclosure uses standard coding terminology; however, it should be understood that the term macroblock or block is intended to describe a block of pixels of any size or shape that is used for the basis of encoding. Broadly speaking, a "macroblock" could be as small as a single pixel, or as large as an entire video frame. Namely, since a given macroblock (MB) in H.263 can be coded in various forms (which will lead to a variable number of motion vectors for that MB) some information regarding the macroblock are added to the motion file to assist the encoder in using the motion information.

More specifically, the presence of motion information field 420 is implemented as a single bit per macroblock. A zero ("0") indicates that there are no motion vectors associated with a current MB (which would be the case if the MB is not encoded (COD=1) or if it is encoded in INTRA mode). A one ('1') indicates that there is one motion vector for the current macroblock, where the motion vector is stored in the motion information field 440.

Optionally, the mode information field 430 is provided to further distinguish between the COD=1 case, and the INTRA mode. Namely, if the encoder is informed that no motion information is available for a current block, then the encoder must determine whether the absence of motion information is due to the lack of motion in the current block or the macroblock is being Intra coded. Generally, an encoder will perform a Sum of Absolute Difference (SAD) calculation when no motion vector is available for the purpose of determining whether the MB should be INTRA coded. Namely, the absolute difference between each corresponding pixel value, e.g., within an area such as a macroblock between successive frames is performed. Next, a sum of the all the absolute difference values is compared to a predicted SAD, which serves as a threshold to measure the degree of change in the macroblock. The Mode Decision is then selected accordingly, i.e., Intra coding for substantial change and Inter coding for insubstantial change. Unfortunately, these SAD calculations are time consuming and will affect the performance of the real-time encoder.

As such, the mode information field 430 provides an additional bit such that the combination of the presence of motion information field and the mode information field allows the implementation of a variable length code (one or two bits) in the motion file that can be used to indicate both the COD and the MB type (Intra or no motion). For example, a '0' would indicate COD=1, a '10' would indicate mode= INTRA and a '11' would indicate mode=INTER and presence of a motion vector. The implementation of the reason for absence of motion information field 430 increases the speed of the encoder at the expense of creating larger motion files.

In the present invention, a motion file is generated for each frame rate of an image sequence. However, it should be noted that additional coding information can be inserted into the motion file such as Advanced Prediction (AP) mode and the PB-frame mode as described in the H.263 standard. However, as additional information is inserted into the motion file, the size of these motion files should be balanced so as not to impose an impractical increase in the storage requirement of the server.

Returning to FIG. 3, in step 360, method 300 queries whether the transfer is completed. If the query is negatively answered, then method 310 returns to step 310 and continues sending the image sequence to the client at a predefined frame rate. If the query is affirmatively answered, then method 300 ends in step 370.

In the present invention, the user can either specify the desired frame rate, or provide the target bit-rate to the server and have the server find an optimum between the frame rate and the quantization parameter. The server would then determine on a frame by frame basis if the frame is to be encoded or not. For frames that need to be encoded and transmitted, it will open the motion file corresponding to the frame rate, and encode the frames accordingly.

One of the advantages of the present invention is that since motion estimation is done off-line, a full search algorithm and a wide range of motion vectors can be used to obtain the optimum compression efficiency.

Figure 5:
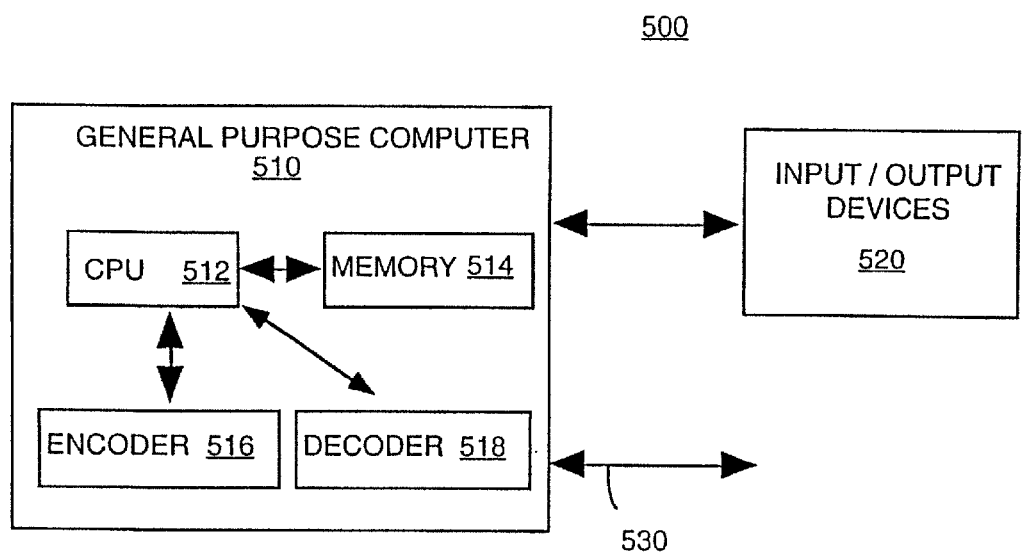
FIG. 5 illustrates a block diagram of an encoding system of the present invention.

FIG. 5 illustrates an encoding system 500 of the present invention. The encoding system comprises a general purpose computer 510 and various input/output devices 520. The general purpose computer comprises a central processing unit (CPU) 512, a memory 514, an encoder 516 and a decoder 518 for receiving and encoding a sequence of images.

In the preferred embodiment, the encoder 516 is simply the encoder 200 and the decoder 518 is simply the decoder 114 as discussed above. In fact, the entire server 110 can be implemented using the general purpose computer 510. The encoder 516 and the decoder 518 can be physical devices which are coupled to the CPU 512 through a communication channel. Alternatively, the encoder 516 and the decoder 518 can be represented by a software application (or a combination of software and hardware, e.g., application specific integrated circuits (ASIC)) which is loaded from a storage device and resides in the memory 512 of the computer. As such, the encoder 200 of the present invention can be stored on a computer readable medium, e.g., a memory or storage device. In turn, the motion information, i.e., motion files and the encoded image sequence at various frame rates, which are generated by the encoder 516, can also be stored on a computer readable medium, e.g., RAM memory, magnetic or optical drive or diskette and the like.

The computer 510 can be coupled to a plurality of input and output devices 520, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device.

Although various embodiments which incorporate the teachings of the present invention have been shown and described in detail herein, those skilled in the art can readily devise many other varied embodiments that still incorporate these teachings.

What is claimed is:

1. A method for dynamically controlling the frame rate of an image sequence, said method comprising the steps of:
    a) transferring the image sequence at a first frame rate;
    b) receiving a request for a change from said first frame rate to a second frame rate; and
    c) transferring the image sequence at said second frame rate by retrieving stored information of said image sequence in accordance with said second frame rate, wherein said transferring step transfers the image sequence at said second frame rate by retrieving a stored motion information of said image sequence encoded at said second frame rate.

2. The method of claim 1, wherein said retrieving step comprises the step of retrieving motion vectors from a motion file of said image sequence encoded at said second frame rate.

3. A method for storing information of an image sequence to effect dynamic frame rate control, said method comprising the steps of:
    a) storing said image sequence encoded at a first frame rate; and
    b) storing the motion information of the image sequence encoded at least at a second frame rate.

4. The method of claim 3, further comprising the steps of:
    c) retrieving the motion information of said image sequence encoded at said second frame rate; and
    d) transferring the image sequence at said second frame rate.

5. A data structure stored on a computer readable medium comprising:

a start of frame code field;

a motion information field; and a presence of motion information field.

6. The data structure of claim 5, further comprising a mode information field.

7. The data structure of claim 6, wherein said presence of motion information field and said mode information field contain variable length codes.

8. The data structure of claim 5, wherein said presence of motion information field contains presence of motion information for a block.

9. A computer-readable medium having stored thereon a plurality of instructions, the plurality of instructions including instructions which when executed by a processor, cause the processor to perform steps comprising:

a) transferring the image sequence at a first frame rate;

b) receiving a request for a change from said first frame rate to a second frame rate; and c) transferring the image sequence at said second frame rate by retrieving stored information of said image sequence in accordance with said second frame rate, wherein said transferring step (c) comprises the step of transferring the image sequence at said second frame rate by retrieving a stored motion information of said image sequence encoded at said second frame rate.

10. The computer-readable medium of claim 9, wherein said retrieving step comprises the step of retrieving motion vectors from a motion file of said image sequence encoded at said second frame rate.

11. A server for dynamically controlling the frame rate of an image sequence, said server comprising:

a means for transferring the image sequence at a first frame rate;

a means for receiving a request for a change from said first frame rate to a second frame rate; and wherein said transferring means transfers the image sequence at said second frame rate by retrieving stored information of said image sequence in accordance with said second frame rate, wherein said stored information is a stored motion information of said image sequence encoded at said second frame rate.

12. The server of claim 6, wherein said stored motion information are motion are motion vectors from a motion file of said image sequence encoded at said second frame rate.

* * * * *